April 9, 1968 — R. A. FRALICK — 3,377,085
TRASH CART
Filed May 6, 1966

INVENTOR
Roy A. Fralick
BY
Mahoney & Hornbaker
ATTORNEYS

United States Patent Office 3,377,085
Patented Apr. 9, 1968

3,377,085
TRASH CART
Roy A. Fralick, 15944 Lujon St.,
Hacienda Heights, Calif. 91745
Filed May 6, 1966, Ser. No. 548,124
3 Claims. (Cl. 280—408)

ABSTRACT OF THE DISCLOSURE

Horizontal longitudinal and lateral cross members form longitudinally adjacent carts which are solely supported by wheels at ends of the lateral support members and are connected by pivot means between adjacent ends of the longitudinal cross members permitting lateral, but preventing horizontal, pivoting therebetween. Spaced flanges on all of the cross members slidably downwardly receive and horizontally confine containers fully centered over the wheels, which containers are vertically slidably removable. A vertically, but not horizontally, pivotal handle is connected to the free end of one cart longitudinal cross member for horizontally moving the coupled carts.

---

This invention relates to a trash cart for hauling two substantially identical trash containers and more particularly, to a trash cart formed by two cart members, each having a single laterally extending axle means thereon movably supporting said cart members and normally permitting longitudinal pivoting of said cart members about said single axle means, with pivot means longitudinally connecting said cart members substantially preventing said longitudinal pivoting and permitting lateral pivoting therebetween.

Many prior forms of trash carts have been provided for hauling the usual forms of trash receptacles, for instance, the usual trash drums. One such form might be the usual hand-pulled, four wheeled wagon in which several trash drums may be positioned and removed as desired. Probably the principal difficulties with these prior trash carts is that are usually difficult to maneuver, are relatively heavy to haul by hand, are relatively expensive to provide the simple purpose intended.

It is therefore, an object of my invention to provide a trash cart for hauling trash receptacles, such as trash drums, which provides easy hand maneuverability. This is accomplished by forming the trash cart of two, preferably virtually identical, cart members each having single laterally extending axles rotatably supporting laterally spaced wheels thereon so that each of these cart members, taken alone, would normally pivot longitudinally about its single axle. These cart members are, however, longitudinally connected as a single unit by pivot means extending longitudinally therebetween and formed to substantially prevent this longitudinal pivoting of the individual cart members while permitting free lateral pivoting therebetween, and thereby maximum maneuverability.

It is another object of my invention to provide a trash cart of the foregoing character which is relatively light in weight and easy to hand pull. Each of these cart members may be formed simply of single longitudinally and laterally extending cross members with the wheels being rotatably supported at the ends of the laterally extending cross members and the pivot means connecting the adjoining ends of the longitudinally extending cross members. Furthermore, upstanding flanges may be provided on these cross members for horizontally confining the trash receptacles substantially centered over the respective axle means so as to properly balance the cart members during movement thereof.

It is an additional object of my invention to provide a trash cart of the foregoing character in which the pivot means may be of maximum simplicity while still efficiently performing the necessary function thereof. As stated, this pivot means may be provided between the adjoining ends of the longitudinally extending cross members and may be formed by a pair of horizontally extending and vertically spaced plates on one of the cross members receiving a horizontal bar on the other of the cross members, with a pivot pin received vertically through these plates and bar. Obviously, the overall trash cart construction is of maximum simplicity and may be provided at a minimum of cost, not possible with prior trash carts.

Other objects and advantages of the invention will be apparent from the following specification and the accompanying drawing which is for the purpose of illustration only, and in which.

Figure 1:
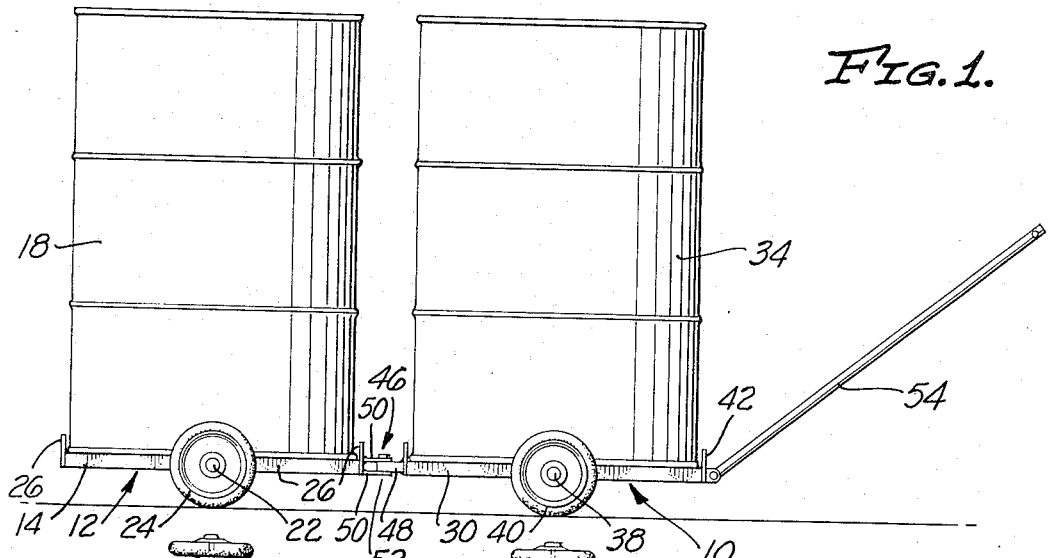
FIG. 1 is a side elevational view of an embodiment of the trash cart incorporating the principles of the present invention and with trash receptacles positioned thereon.
Figure 2:
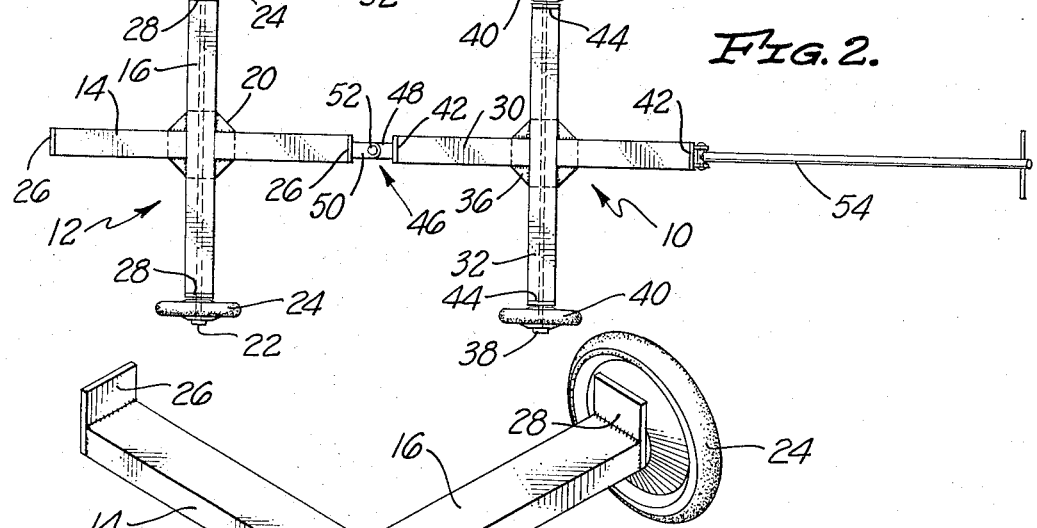
FIG. 2 is a top plan view of the trash cart of FIG. 1 with the trash receptacles removed.

Referring to the drawing, the embodiment of the trash cart illustrated and incorporating the principles of the present invention includes a front or first cart member 10 and a rear or second cart member 12, and these cart members may be formed of the usual structural materials and fabricated in the usual manner well known to those skilled in the art. As previously stated, the first and second cart members 10 and 12 are virtually identical, with several exceptions concerning the pivotal connection therebetween and the means for hand pulling the overall trash cart. For this reason, a detailed description of one will suffice for the other, except for the differences therebetween, which will be explained in detail later.

Figure 3:
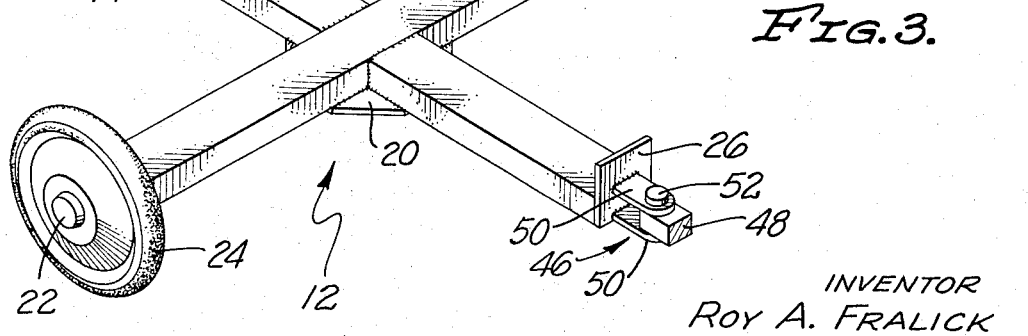
FIG. 3 is an enlarged, fragmentary, perspective view of the trash cart of FIG. 1 showing the rear or second cart member and the pivotal connection thereof to the connecting bar of the front or first cart member.

Thus, the rear or second cart member 12, shown enlarged in FIG. 3, includes the longitudinally extending cross member 14 and the laterally extending cross member 16, each of which crosses centrally of the other so that longitudinal cross member 14 is laterally centered relative to lateral cross member 16 and lateral cross member 16 is longitudinally centered relative to longitudinal cross member 14. Longitudinal cross member 14 is preferably formed in two halves secured abutting lateral cross member 16 so that these cross members present a smooth horizontal supporting surface for receiving a trash drum 18, as shown in FIG. 1. Furthermore, the longitudinal and lateral cross members 14 and 16 may be reinforced at their point of joinder by the reinforcing flanges 20 in the usual manner.

An axle 22 is supported extending laterally through the lateral cross member 16 and supports a pair of wheels 24 rotatable adjacent the laterally spaced ends of this lateral cross member. Thus, the rear cart member 12 is supported for movement by the wheels 24, but this cart member would normally tend to pivot longitudinally about the axle 22 and these wheels, such pivoting being prevented in a manner to be hereinafter described.

Longitudinal cross member 14 is formed with the vertically upstanding flanges 26 at the end thereof and extending above the supporting surface of this cross member. Lateral cross member 16 is formed with similar flanges 28 positioned adjacent the wheels 24. These flanges 26 and 28, therefore, constitute means for horizontally confining trash drum 18 positioned on this cart member 12 and retain this trash drum substantially longitudinally centered over lateral cross member 16 and axle 22 thereof.

As before stated, the front or first cart member 10 is substantially identical to the rear or second cart member 12 and therefore includes the longitudinally extending cross member 30 and the laterally extending cross member 32 which form the supporting surface for the trash drum 34. The connection of these cross members 30 and 32 is reinforced by the reinforcing flanges 36, and lateral cross member 32 supports the axle 38 which in turn rotatably mounts the laterally spaced wheels 40. Again, cross members 30 and 32 are formed with the vertically upstanding flanges 42 and 44 which extend above the cross member supporting surfaces and horizontally confine trash drum 34 supported on these cross members.

The pivotal connection 46 between front and rear cart members 10 and 12, the function of which forms an important part of the present invention, includes the rectangular cross section, horizontal bar 48 secured to the rearward end of longitudinal cross member 30 on front cart member 10 and extending longitudinally toward rear cart member 12. This pivotal connection 46 further includes the flat, horizontal and vertically spaced plates 50 which are secured to the forward end of longitudinal cross member 14 on rear cart member 12 and extend longitudinally toward front cart member 10. Plates 50 are vertically spaced substantially the vertical thickness of bar 48 so that this bar may be received therebetween with the vertical pivot pin 52 being received through the plates and bar.

Thus, pivotal connection 46 connects front and rear cart members 10 and 12 for lateral pivotal movement about pivot pin 52. At the same time, the relatively close fit between bar 48 and plates 50 prevents the longitudinal pivoting of front and rear cart members 10 and 12 about lateral cross members 32 and 16 thereof. This is true even though trash drums 34 and 18 may be positioned slightly off center of these cart members 10 and 12.

Thus, by the operable connection of the handle 54 to the forward end of longitudinal cross member 30 on front cart member 10, front and rear cart members 10 and 12 may be hand-pulled as a trash cart unit and pivotal connection 46 therebetween will provide complete maneuverability for this trash cart.

Furthermore, in view of the simplified cross member construction of these cart members 10 and 12, the trash cart is extremely strong for supporting heavy trash drums 18 and 34, yet due to the simplicity thereof, is relatively light and may be provided at a minimum of cost.

I claim:

1. In coupled trash carts, the combination of: first and second longitudinally adjacent cart members; each of said cart members including a laterally central longitudinally extending cross member and a longitudinally central laterally extending cross member, said cross members being centrally secured extending generally horizontally; mounting means movably supporting each of said cart members including axle means rotatably supporting laterally spaced wheels at laterally spaced ends of said laterally extending cross members, said cart members being free of other movable support; pivot means longitudinally connecting ends of said cart member longitudinally extending cross members substantially preventing vertical pivoting between said longitudinally extending cross members while permitting lateral pivoting therebetween; longitudinally spaced and vertically upwardly extending flange means mounted on each of said cart members longitudinally extending cross members uniformly spaced relative to centers of rotation of said wheels, laterally spaced and vertically upwardly extending flange means mounted on each of said cart members laterally extending cross members uniformly spaced relative to said longitudinally extending cross members, said flange means being constructed and arranged for freely downwardly slidably receiving and combined longitudinally and laterally confining bottom portions of particularly sized containers, said flange means permitting free upward slidable removal of said containers from said flange means and cart members; and means operably connected to a free end of one of said cart members longitudinally extending cross members for simultaneously horizontally moving said cart members.

2. Coupled trash carts as defined in claim 1 in which said pivot means longitudinally connecting said cart members includes horizontally extending vertically spaced plates on one of said cart members longitudinally extending cross members receiving a horizontally extending bar on the other of said cart member longitudinally extending cross members therebetween, a pivot pin extending vertically through said plates and bar, the combined cooperation between said plates and said bar and said pivot pin substantially preventing said vertical pivoting while permitting said lateral pivoting.

3. Coupled trash carts as defined in claim 1 in which said pivot means longitudinally connecting said cart members includes horizontally extending vertically spaced plates on one of said cart members longitudinally extending cross members receiving a horizontally extending bar on the other of said cart member longitudinally extending cross members therebetween, a pivot pin extending vertically through said plates and bar, the combined cooperation between said plates and said bar and said pivot pin substantially preventing said vertical pivoting while permitting said lateral pivoting; and in which said means for simultaneously moving said cart members includes vertically pivotal handle means operably connected against lateral pivoting relative to said longitudinal extending cross member of said one cart member.

References Cited

UNITED STATES PATENTS

| | | | |
|---|---|---|---|
| 769,820 | 9/1904 | Diplock | 280—408 |
| 944,197 | 12/1909 | Lyon | 280—47.16 |
| 1,972,423 | 9/1934 | Larson | 280—515 |
| 2,665,922 | 1/1954 | Bard | 280—79.2 X |

FOREIGN PATENTS

| | | |
|---|---|---|
| 520,909 | 2/1921 | France. |
| 24,112 | of 1913 | Great Britain. |

LEO FRIAGLIA, *Primary Examiner.*